April 15, 1941.  A. J. PEDIGO  2,238,074
REFRIGERATING APPARATUS
Filed April 8, 1939   4 Sheets-Sheet 1
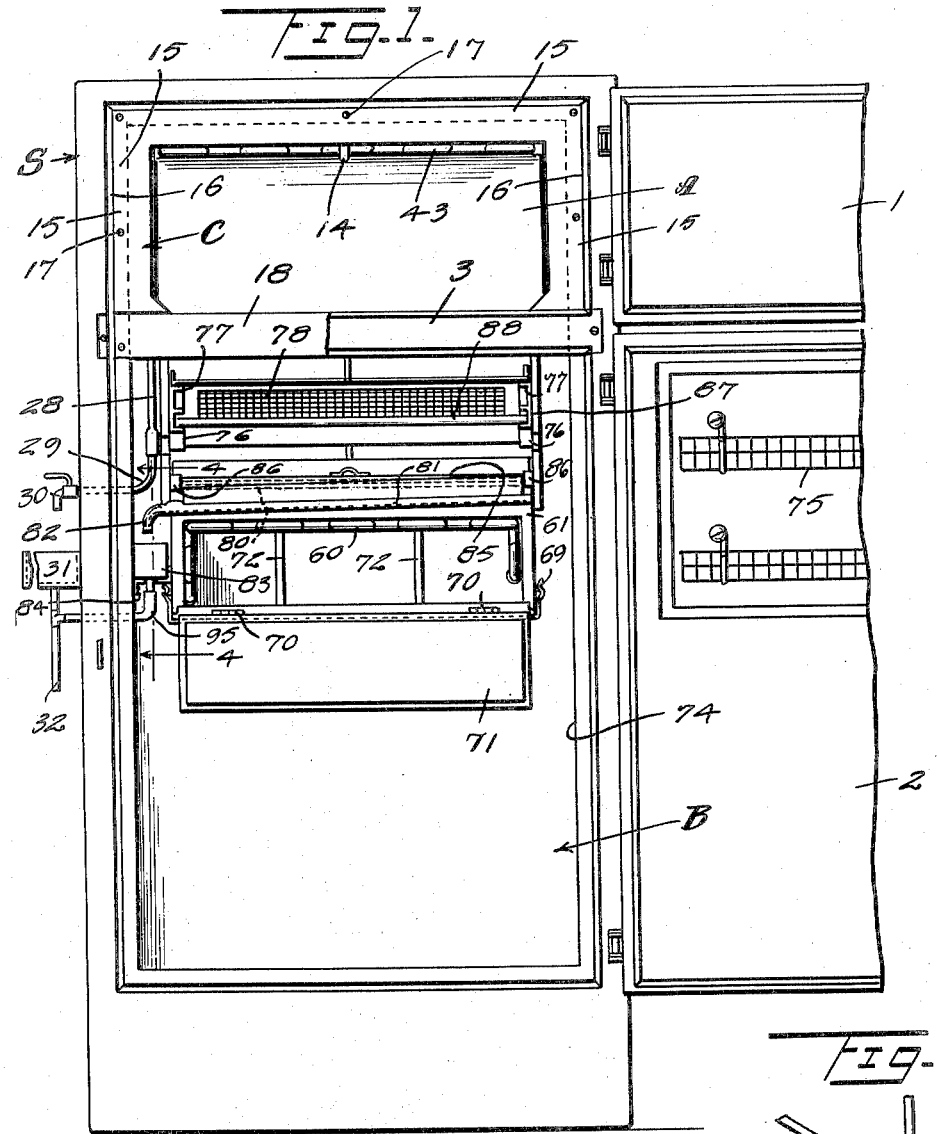
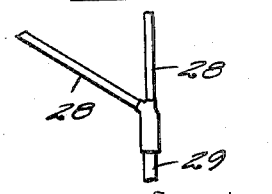
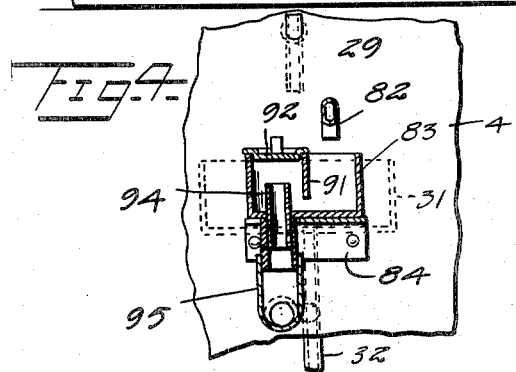
Inventor
A.J.Pedigo
By Watson E. Coleman
Attorney

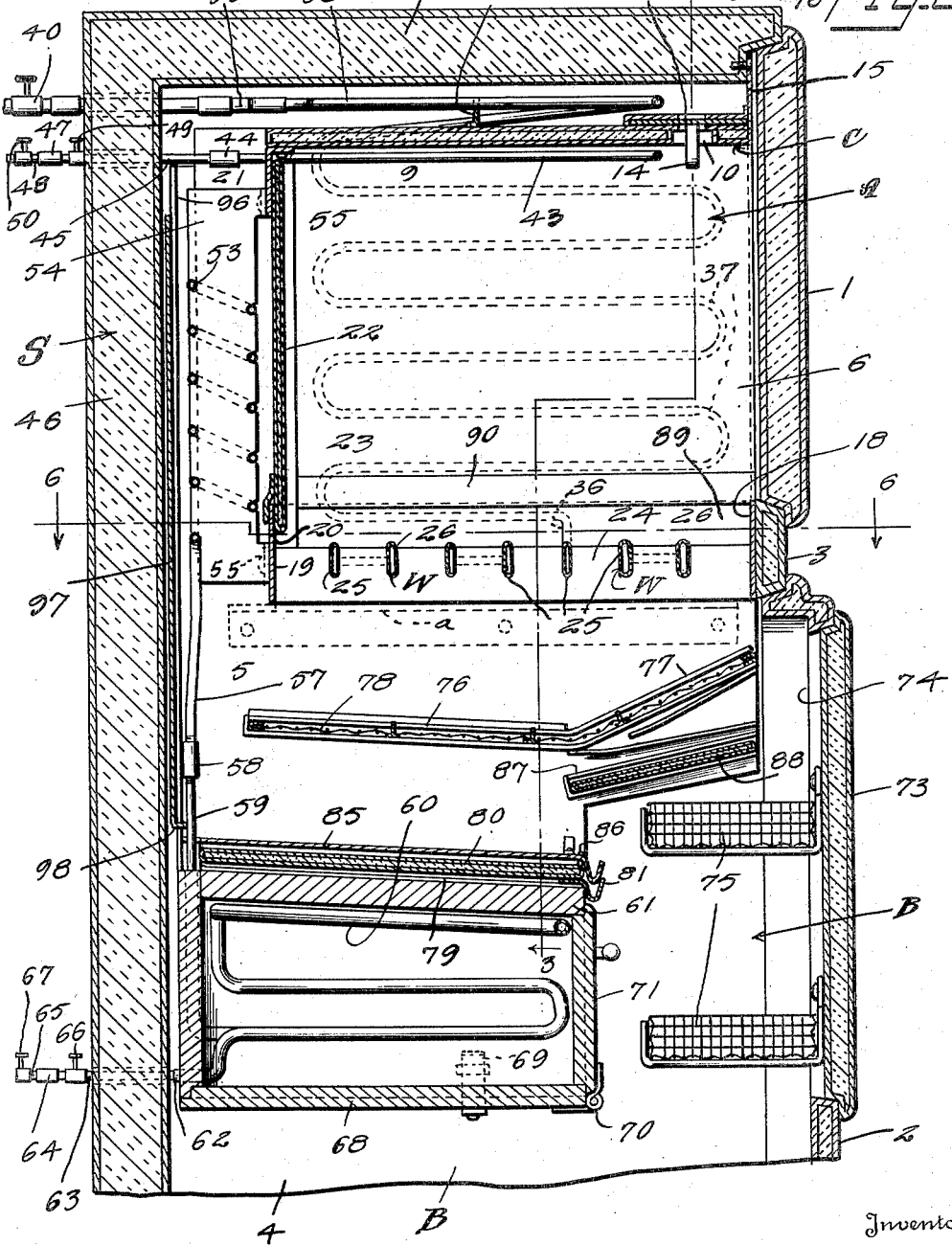

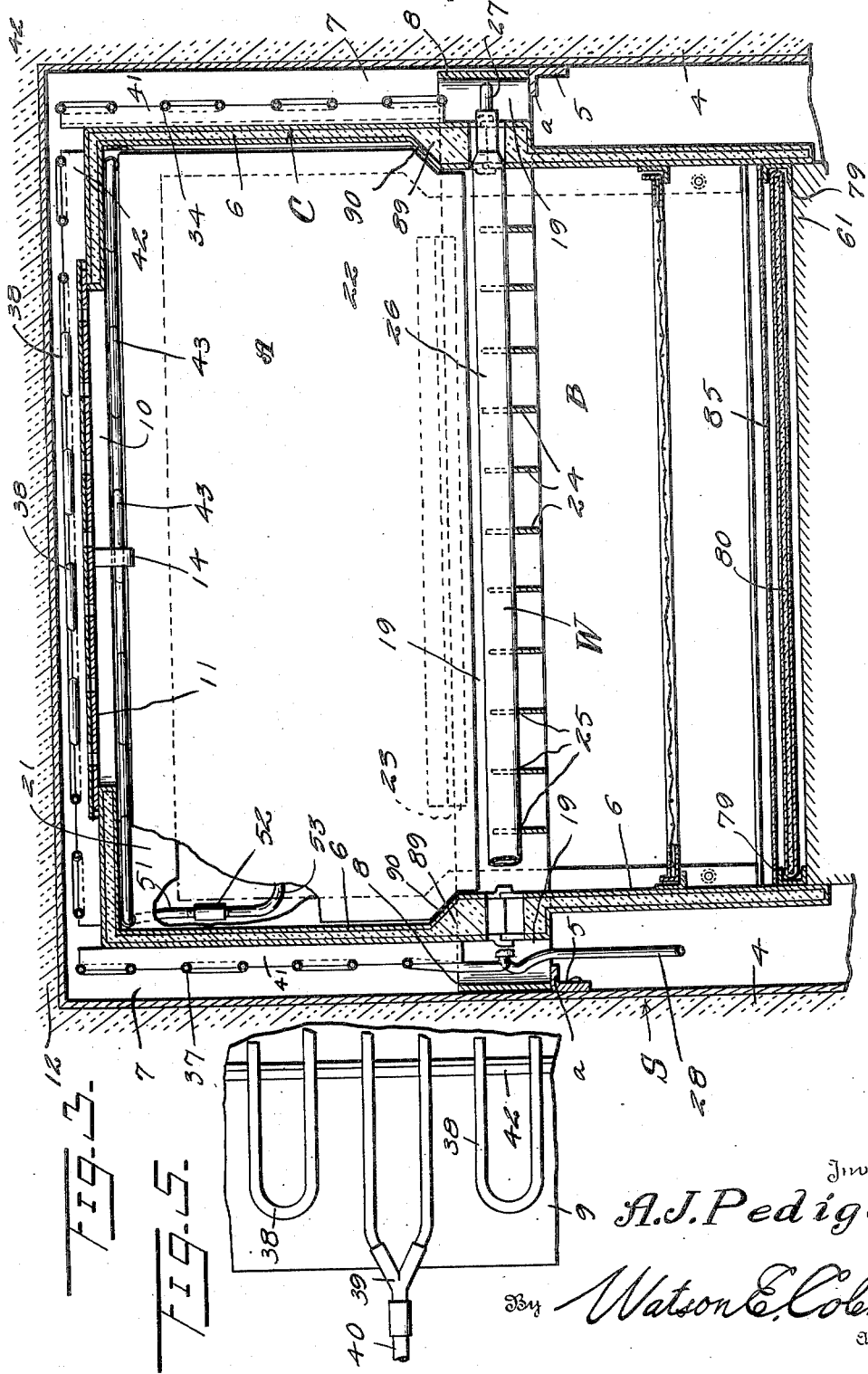

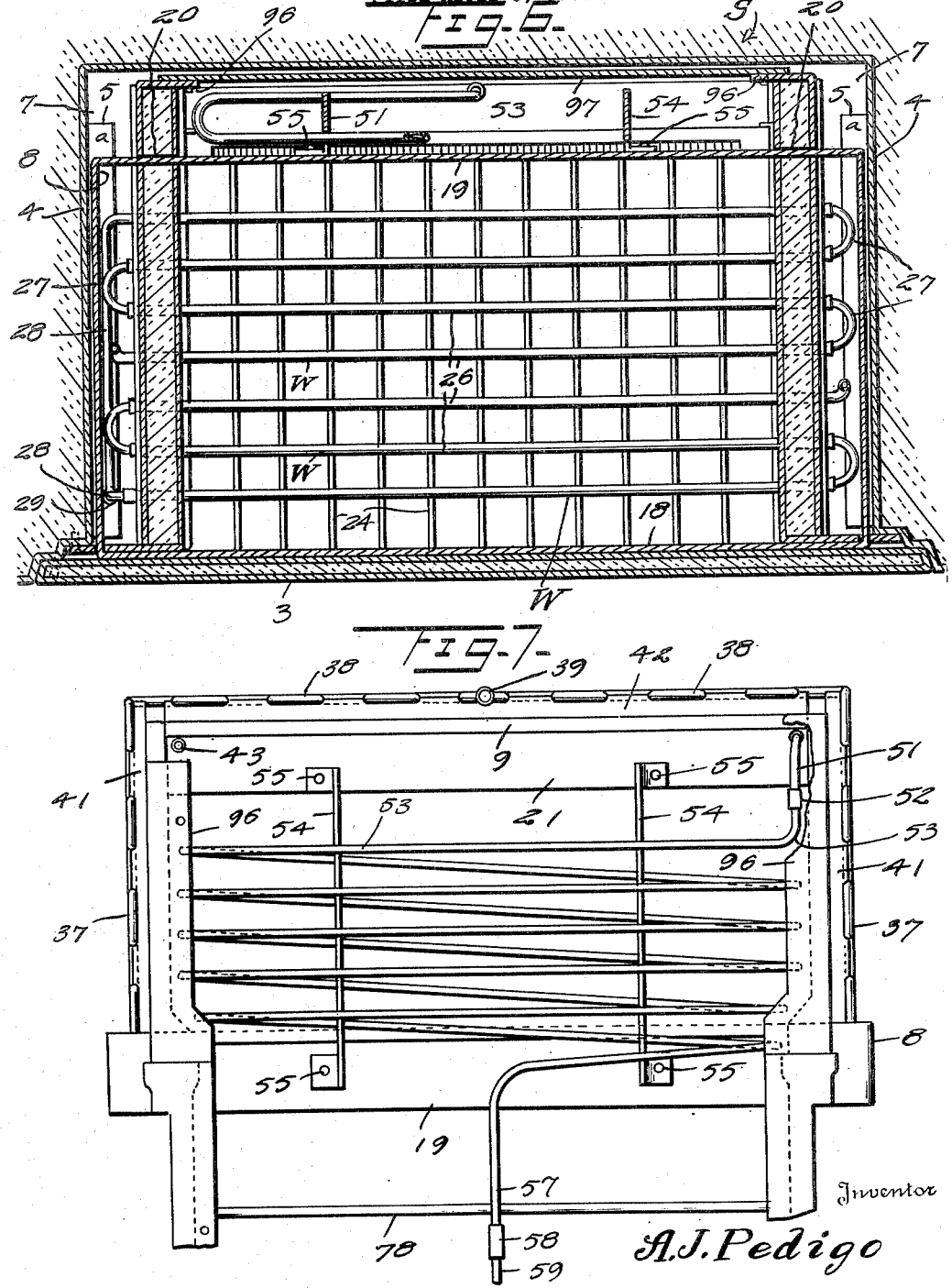

Patented Apr. 15, 1941

2,238,074

UNITED STATES PATENT OFFICE 2,238,074

REFRIGERATING APPARATUS

Arthur J. Pedigo, Cookeville, Tenn.

Application April 8, 1939, Serial No. 266,831

6 Claims. (Cl. 62—89)

This invention relates to a refrigerating apparatus and is an improvement over the apparatus as embodied in my pending application Serial No. 209,333 filed May 21, 1938.

It is a particular object of the invention to provide an apparatus of this kind including a refrigerating assembly allowing the use of both melting ice and a mechanical refrigerating unit, together with a freezing unit within the food chamber of the apparatus.

It is also an object of the invention to provide an apparatus of this kind including a food chamber having a freezing unit therein together with a door for coaction with both the food chamber and the freezing unit and wherein said door is provided with a supplemental door to allow access to the freezing unit without the necessity of opening the first door with a resultant raising of the temperature within the food chamber.

The invention has for a further object to provide an apparatus of this kind wherein the freezing unit is positioned within the food chamber and which unit is contained within an insulated shell so constructed and arranged to provide means to allow, when desired, exposure of the coils of the freezing unit to the heat of the food chamber when refrigeration is cut off to permit such coils to de-frost Another object of the invention is to provide a refrigerating apparatus combining the best features of both mechanical and ice refrigeration and in a manner whereby the ice serves as a medium to humidify or add moisture to the air within the food chamber to assure the maintenance of the food in the best condition and wherein the melting ice also serves to absorb such foreign matter within the air as it circulates in the apparatus to eliminate odor as well as tainting of the food within the food chamber.

A still further object of the invention is to provide means whereby water may be cooled for drinking purposes without becoming contaminated.

The invention consists in the details of construction and in the combination and arrangement of the several parts of my improved refrigerating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in elevation of a refrigerating apparatus constructed in accordance with an embodiment of my invention, the doors being in open position, and portions being broken away;

Figure 2 is a vertical sectional view taken thru the upper portion of the structure as illustrated in Figure 1;

Figure 3 is a detailed sectional view taken substantially on the line 3—3 of Figure 2 looking in the direction of the arrows;

Figure 4 is a fragmentary view partly in elevation and partly in section illustrating the trap associated with the cold water discharge line;

Figure 5 is a fragmentary view in top plan showing the inlet portion of the water coils;

Figure 6 is a horizontal sectional view taken substantially on the line 6—6 of Figure 2;

Figure 7 is a view in rear elevation of the box and certain of the parts directly associated therewith unapplied;

Figure 8 is a fragmentary view showing the connection between the terminals of the water coils with a common discharge pipe.

As disclosed in the accompanying drawings, S denotes a shell or case of desired dimensions and configuration and constructed in a conventional manner to provide the required insulation. The front face of the shell or case S is open and coacting with said open face are the swinging doors 1 and 2, the upper door 1 permitting access to the chamber A for the melting ice and the lower door 2 permitting access to the food chamber B. Bridging the front open face of the shell or case S and disposed transversely thereof is a cross member or sill 3 maintained in desired position in any manner preferred. The doors 1 and 2 are also of an insulated type.

Suitably secured to the inner faces of the side walls 4 of the shell or case S and extending transversely thereof are the angle bars 5. These bars 5 in the present embodiment of the invention are below but closely adjacent to the cross member or sill 3. These bars 5 have inwardly disposed flanges a in coplanar relation. The cross member or sill 3 is detachably held in place so that when said cross member or sill 3 is removed the box C may be readily placed within the upper portion of the shell or case S and supported upon the bars 5.

The box C comprises the insulated side walls 6 of desired dimensions and design and which are spaced apart a distance less than the distance between the inner faces of the side walls of the upper portion of the shell or case S whereby side circulating air flues 7 are provided. These side walls 6 are each provided therealong at a predetermined point intermediate its upper and lower edges with an elongated loop bracket 8 which has direct contact from above with a bar 5. Through the medium of these brackets 8 and bars 5 the box C is supported in desired position within the upper portion of the shell or case S as is particularly illustrated in Figure 3 of the drawings.

The box C also includes an insulated top plate 9 which bridges the space between the side walls 6 and which extends from the forward vertical edges of said walls 6 to a point spaced inwardly of the rear vertical edges thereof. The forward marginal portion of this top plate 9 is provided therealong with a slot 10 which extends substantially from one side wall 6 to the other. Coacting with this slot 10 is a sliding damper 11 of a conventional type whereby communication with the interior of the box C and the space between the top plate 9 and the top wall 12 of the shell or case S may be readily regulated. This sliding damper 11 is operated by a handle member 14 carried by said damper 11 and extending through the slot 10.

The forward marginal portions of the end walls 6 and the top plate 9 are defined by the outstanding flanges 15 which extend within the rabbets 16 for the upper door 1 and which flanges 15 are secured by the screws 17 or the like to the base of such rabbets.

The brackets 8 hereinbefore referred to have their forward ends connected by a front strip 18, preferably of sheet metal, which has contact with the inner face of the applied cross member or sill 3 as illustrated in Figure 2 of the drawings, while the rear end portions of these brackets 8 are connected by a second or rear cross strip 19. This strip 19 is at a desired point inwardly of the rear vertical edges of the side walls 6 and, of course, each of such side walls 6 is provided therethrough with a suitable slot 20 through which said rear strip 19 readily passes. The front strip 18 has each end portion thereof welded or otherwise securely fixed to the lower portion of the side flange 15.

The rear marginal portion of the top plate 9 of the box C is provided therealong with a depending flange 21 directly above the rear strip 19 as illustrated in Figure 2. The box C has an insulated rear or back wall 22 adapted to be applied or removed as desired. As herein disclosed the lower marginal portion of this back plate or wall 22 is provided therealong with an offset flange 23 which allows the upper marginal portion of the strip 19 to engage between this offset flange 23 and the plate 22 to hold said plate 22 in position with the upper portion of the plate contacting with the inner face of the upper flange 21.

The strips 18 and 19 are connected by the spaced strips or flat members 24 arranged in parallelism and which strips have their extremities welded or otherwise securely fixed to the strips 18 and 19. The upper marginal portions of these strips or members 24 are provided with the spaced recesses 25 in which are received the parallel straight portions 26 of the water coils W. It is to be noted that the straight portions 26 of the front coil W have their bores of greater diameter than that of the straight portions 26 of the rear coil. This is to compensate for the differences in temperature between the front portion of the box and the rear thereof.

The straight portions 26 of each of the coils extend through and beyond the side walls 6 and the adjacent extremities of each of the coils W are connected by a U-coupling 27. The outer end of each of the coils W has leading therefrom an outlet pipe 28 delivering to a common pipe 29 which extends through a side wall 4 of the case or shell S and the extended portion of said pipe 29 has coupled thereto a conventional faucet 30. Positioned below this faucet 30 is a holder 31 for a drinking glass or the like which is suitably secured to the shell or case S exteriorly thereof, and said holder 31 has leading therefrom a drain line 32. This pipe or line 32 leads to a desired point of discharge.

It is to be stated that any suitable detachable coupling means may be provided for connecting the lines 28 and 29 so that the box C and the parts carried thereby may be readily applied or removed as desired within the case or shell S.

The inner ends of the coils W are coupled, as at 36, to a side coil 37, there being one of said coils in each of the flues 7 hereinbefore referred to. Each of these coils 34 is continued by a coil 38 positioned within the space between the top plate 9 of the box C and the top wall 12 of the case or shell S. The inner ends of these coils 38 are in connection through the medium of a Y-coupling 39 with the pipe line 40 leading from a suitable source of water supply.

The coils W are preferably of copper and the straight portions 26 thereof flattened in cross section with the upper margins of said straight portions 26 substantially flush and with the upper margins of the straight portions 26 extending slightly above the upper edges of the strips or members 24.

The members or strips 24 together with the straight portions 26 of the coils W provide a supporting grid structure for an ice block when placed within the ice compartment or chamber A. In the course of time the lower portion of the ice block will melt in a manner to permit the ice block to extend down through said grid resulting in the formation of lower ice columns whereby is provided an increased ice surface to be contacted by the air circulating within the box or case S. The coils 37 are effectively maintained in applied position within the flues 7 by the vertically disposed strips 41 secured to the outer faces of the side walls 6 and which strips 41 maintain the coils 37 spaced from said side walls. The upper coils 38 are also held in position by the strips 42 mounted upon the upper surface of the top plate 9 and which strips maintain said coils 38 suitably spaced from said top plate.

As clearly illustrated in the accompanying drawings, the box C has its side, top and rear spaced from the adjacent walls of the shell or case S so that air may readily circulate therearound and whereby the water within the various coils 37 and 38 is pre-cooled before entering the coils W.

Within the box C and closely adjacent to the top plate 9 thereof is an absorption coil 43 comprised in a mechanical refrigerating system which may be of any type preferred. As the mechanical refrigerating system in itself forms no particular part of the present invention it is not believed that a detailed description and illustration thereof is necessary.

The induction end of the coil 43 is extended through the upper strip 21 adjacent to a side wall 6 and is detachably coupled, as at 44, to a pipe line 45 extending through the rear wall 46 of the case or shell S. This line 45 is also detachably coupled, as at 47, to the pipe line 48 leading to the condenser comprised in the refrigerating system. The pipe line 45 in advance of the coupling 47 has a valve 49 interposed therein while the line 45 adjacent to the coupling 47 has the valve 50 interposed therein. These valves 49 and 50 are to be closed when the coupling 47 is disconnected as in the shifting or moving of the case or shell S.

The opposite end of the coil 43 is continued by the pipe line 51 through the rear strip 21 of the box C and said line 51 is coupled, as at 52, to the upper end portion of a second absorption coil 53. This coil 53 is positioned rearwardly of the box C and is supported in desired position by the vertically disposed strips 54, the opposite ends of which are anchored, as at 55, to the strips 19 and 21.

It is to be stated at this time that if preferred the strips 41 and 42 may be free of connection with the top wall 9 and the spacer bars 41 may also be entirely free of connection with the side walls 6. The lower or discharge end of the coil 53 is continued by a pipe line 57 detachably coupled, as at 58, to a pipe line 59 leading to a properly formed and designed absorption coil 60 mounted within a freezing housing 61. The opposite or induction end of the coil 60 is detachably coupled, as at 62, with a pipe line 63 herein disclosed as extending through the rear wall 46 of the case or shell S. The outer extremity of this pipe 63 is detachably coupled, as at 64, to the usual liquid or expansion line 65 leading from the condenser of the mechanical refrigerating system.

The pipe 63 in advance of the coupling 64 has a valve 66 interposed therein while the line 65 has interposed therein a valve 67. The valves 66 and 67 are intended to be closed when the apparatus is being shifted for any reason or the box C and the parts carried thereby are being removed from within the case or shell S.

The housing 61 is of desired dimensions and configuration and is suitably secured to and supported between the lower rear portions of the side walls 6. This housing 61 has a removable bottom 68 held in applied position by the conventional latches 69 or otherwise as may be preferred. Hingedly connected, as at 70, to the forward marginal portion of the bottom 68 is a door 71 for closing the front of the housing 61. As particularly illustrated in Figures 1 and 2 this door swings upwardly into closed position and vice versa.

As illustrated in Figure 1, the interior of the housing 61 may be divided into a plurality of compartments through the medium of the removable partitions 72 so that when desired a compartment may be provided for the storage of frozen foods or the like which are desired to be kept at a temperature below freezing until used while the remaining compartments may be employed for freezing purposes.

It is to be stated that the walls of the housing 61 besides the door 71 will be properly insulated and preferably by glass wool as the location of this housing 61 within the food chamber B makes the same susceptible to excess moisture.

The upper portion of the door 2 is provided therethrough with an opening 74 normally closed by the door 73 preferably of a swinging type. The opening 74 permits ready access to the housing 61 without the necessity of opening the door 2. It is also to be noted that the opening 74 is so located and of such dimensions as to permit convenient access to the space between the water coils W and the housing 61.

The inner face of the door 73 has suitably secured thereto the food trays 75. By having these trays 75, or shelves as they may be called, carried by the door 73 the items carried by such trays or shelves 75 can be removed without the necessity of opening the larger door 2 which would let the cold air out of the bottom portion of the chamber B with resultant rise of temperature within the case or shell S.

While the housing 61 is particularly desirable in the freezing of ice cubes, desserts and the like, upon removal of the bottom 68 and the door 71 carried thereby, the absorption coil 60 will be exposed to the heat in the food chamber B for de-frosting said coil 60 or when deemed necessary to allow the coil 60 to provide an additional means for lowering the temperature within the chamber B.

Opposed faces of the side walls 6 at a desired distance below the coils W are provided thereacross with the guideways 76, the forward end portions of which are upwardly disposed, as at 77, on a predetermined incline. These guideways 76 receive the side marginal portions of a perforated plate 78 and support said plate in desired position below the coils W. This plate 78, as herein disclosed, is of mesh fabric of desired gauge. As the block of ice positioned upon the grid, as afforded by the strips 24 and coils W melts, the bottom portion of the block will extend down through such grid resulting in the formation of lower ice columns which in time will have contact with the applied plate 78 and after which time the ice block will to a considerable extent be supported upon this plate 78 thus relieving the grid structure. The heat from the foodstuff placed within the chamber B will result in an effective circulation of the air within said chamber. During such circulation the air will pass between the ice columns depending from the grid structure and when desired, upon proper adjustment of the damper 11, can be caused to move downward of the box C around the ice block. The contact of the circulating air with the ice in addition to humidifying the air also serves to free the same from impurities whereby odor within the chamber B is eliminated.

It is to be noted that the forward portion of the plate 78 is upwardly disposed in the same manner as the portion 77 of the guideways 76. This is to compensate for the faster melting of the ice columns at the front or adjacent to the door 2.

The side walls 6 immediately adjacent to the top of the housing 61 are provided therealong with the guideways 79 in which engage the side marginal portions of an insulated plate 80. These guideways 79 are disposed on a forward and downward incline so that the applied plate 80 will correspondingly incline. This plate 80 is provided along its forward marginal portion with a gutter or trough 81 disposed on a downward incline from one side of the plate to the other with the lower end of the gutter or trough 81 being continued by a spout 82. This spout 82 discharges within a receptacle 83 supported within the chamber B adjacent to a side wall thereof by a suitable bracket 84.

The plate 80 may serve as a drain board for the liquid resulting from the melted ice and can be readily removed for cleansing. However, I prefer to superimpose over the board 80 a supplemental drain board 85 which is maintained in applied position by upstanding lugs 86 at the opposite ends of the forward marginal portion of the plate 80. This plate 85 has a gutter or trough-like arrangement which, when placed in position, lies superimposed upon the trough of the plate 80 and can be removed for cleansing.

The side walls 6 immediately below the upwardly inclined portions 77 of the guideways 76 are provided with the inwardly and downwardly disposed guides 87 in which is readily received the end portion of an insulated baffle plate 88. This plate 88 receives the water of the melted ice dripping through the forward portion of the plate 78 and sheds the same upon the plate 85 or the plate 80 when such plate 85 is not in use.

The forward marginal portions of the side walls 6 below the guideways 87 are cut away to allow entrance of the trays or shelves 75 within the chamber B without hindrance or obstruction being offered thereto by the side walls 6.

It is also to be particularly pointed out that the lower portion of each of the side walls 6 is inwardly offset with respect to the upper portion of the side wall whereby is provided a thickened insulated portion 89 extending above and below the water coils W. This thickened portion 89 extends above the strips 18 and 19 and the inner face of said portion above said strips is disposed on an upward and outward incline, as at 90. This increased thickened portion 89 assures an air seal between the ice block within the box C and the walls of the box C adjacent the grid. This is of advantage as there is substantially no refrigeration at the walls of the box C and, therefore, otherwise the heat from within the food chamber and the passages at the sides of the box C would have a tendency to pass through the walls of the box C and melt the ice off more rapidly before the block of ice has had time to melt down to produce the depending columns for contact with the plate 78.

As is particularly illustrated in Figure 4, the spout 82 discharges within the container 83 to one side of a central partition 91 intersecting the upper portion of said container 83 but terminating above the bottom of said container. The top portion of the container 83 at the side of the partition 91 remote from the spout 82 is closed by a removable lid 92 or the like.

Extending from below up within the container 83 at the side of the partition 91 having the top 92 is an overflow pipe 94. This pipe 94 terminates a desired distance above the container 83 and the lower end portion of this pipe 94 discharges into a carry-off pipe 95 which leads to and communicates with the drain pipe 32 hereinbefore referred to. It is believed to be apparent that the container 83 and the parts directly associated therewith provide a trap which seals the air entering the interior of the case or shell S up through the drain pipe 32. The container 83 and the parts coacting therewith are preferably made of glass or other transparent material so that it can be readily seen when the container 83 requires cleaning.

The rear edges of the side walls 6 are formed to provide inwardly directed flanges 96 to which is detachably connected, as by bolts or otherwise as preferred a back plate 97 of desired material. This plate 97 coacts with the plate 22 to assure a desired air passage at the rear of the box C.

The lower portion of the plate 97 is provided with an inwardly disposed and downwardly inclined flange 98 so that the moisture condensing on the plate 97 will drain upon the plate 85 or 80 and be carried off to the drain pipe 32. It is to be further stated that the ice block to be placed within the box C fits therein sufficiently snug as to contact with the inclined portion 90 hereinbefore referred to so that as the ice block melts down there will be close contact of said ice block and said inclined portion 90 thus effecting a seal against air passing up or down around the ice block.

It is also to be stated that if desired valves may be placed at opposite sides of the coupling 44 or 58 and that whenever deemed advisable the various parts of the apparatus as herein disclosed are to be effectively insulated. It is also believed to be obvious that the absorption coils serve to maintain and create such low temperature within the case or shell to materially retard the melting of the ice block and that the operation of the mechanical refrigerating system is preferably under the well known thermostatic control and which control forms no part of the present invention.

From the foregoing description it is thought to be obvious that a refrigerating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A refrigerating apparatus comprising a case, the lower portion of the case constituting a food chamber, a door for permitting access within the food chamber, a box within the upper portion of the case, a horizontally disposed grid supported by the lower portion of the box and constituting a bottom therefor, said box being adapted to contain a block of ice resting upon the grid, a second door carried by the case to permit access within the box, a door carried by the upper portion of the first door operating independently of said first door to allow access within the food chamber without opening the first door, the side walls of the box extending below the grid, a housing supported between said depending portions of the side walls, and a mechanical refrigerating unit including an absorption coil within the housing, a door for the housing readily accessible upon opening of the door in the upper portion of the door for the food chamber.

2. A refrigerating apparatus comprising a case, the lower portion of the case constituting a food chamber, a door for permitting access within the food chamber, a box within the upper portion of the case, a horizontally disposed grid supported by the lower portion of the box and constituting a bottom therefor, said box being adapted to contain a block of ice resting upon the grid, a second door carried by the case to permit access within the box, a door carried by the upper portion of the first door operating independently of said first door to allow access within the food chamber without opening the first door, the side walls of the box extending below the grid, a housing supported between said depending portions of the side walls, a mechanical refrigerating unit including an absorption coil within the housing, and a door for the housing readily accessible upon opening of the door in the upper portion of the door for the food chamber, said mechanical refrigerating unit also including absorption coils within the upper portion of the case and to the rear of the case.

3. A refrigerating apparatus comprising, in combination, a case having a door opening in the upper portion of one of its walls, a door for said opening, a box within the case having side, top and rear walls spaced from the corresponding walls of the case, means for closing the space between said walls of the box and case at the door opening, a grid supported in the lower portion of the box to provide a bottom therefor, said box being adapted to receive a block of ice to be seated upon the grid, and a mechanical refrigerating unit including absorption elements within the upper portion of the box and within the space between the back of the box and the adjacent wall of the case.

4. A refrigerating apparatus comprising, in combination, a case having a door opening in the upper portion of one of its walls, a door for said opening, a box within the case having side, top and rear walls spaced from the corresponding walls of the case, means for closing the space between said walls of the box and case at the door opening, a grid supported in the lower portion of the box to provide a bottom therefor, said box being adapted to receive a block of ice to be seated upon the grid, and a mechanical refrigerating unit including absorption elements within the upper portion of the box and within the space between the back of the box and the adjacent wall of the case, the rear wall of the box being removable.

5. A refrigerating apparatus comprising, in combination, a case having a door opening in the upper portion of one of its walls, a door for said opening, a box within the case having side, top and rear walls spaced from the corresponding walls of the case, means for closing the space between said walls of the box and case at the door opening, a grid supported in the lower portion of the box to provide a bottom therefor, said box being adapted to receive a block of ice to be seated upon the grid, a mechanical refrigerating unit including absorption elements within the upper portion of the box and within the space between the back of the box and the adjacent wall of the case, and a damper provided at the forward portion of the top wall of the box.

6. A refrigerating apparatus comprising, in combination, a case, a horizontally disposed grid supported within the upper portion of the case, said grid constituting a bottom for an ice chamber, a mechanical refrigerating unit including an absorption element positioned above the grid, a plate supported within the case below the grid, the forward portion of said plate being upwardly inclined, said plate being contacted by the depending ice columns formed by the grid to provide a support for the ice block, said plate being perforated, and draining means within the case underlying said plate.

ARTHUR J. PEDIGO.